Sept. 22, 1970 C. BERNS 3,530,245
SELECTIVE SUPPRESSION CONTROL OF AMPLIFIERS
IN INTERCOMMUNICATION SYSTEMS
Filed May 11, 1967
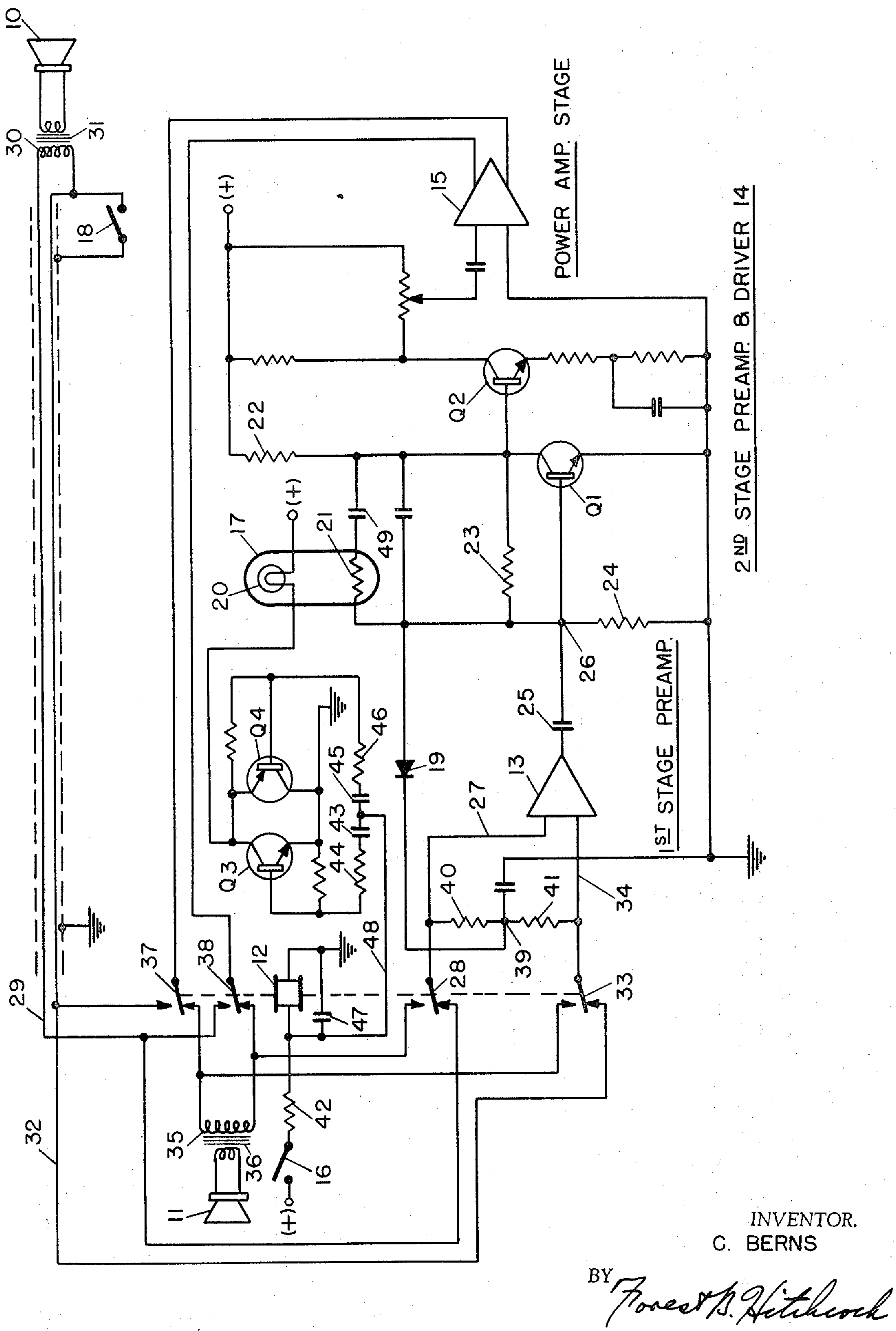
INVENTOR.
C. BERNS
BY Forest B. Hitchcock
HIS ATTORNEY United States Patent Office 3,530,245

Patented Sept. 22, 1970

3,530,245

SELECTIVE SUPPRESSION CONTROL OF AMPLIFIERS IN INTERCOMMUNICATION SYSTEMS

Charles Berns, Brookfield, Conn., assignor to Edwards Company, Inc., Norwalk, Conn., a corporation of Connecticut Filed May 11, 1967, Ser. No. 637,728
Int. Cl. H04m 9/08
U.S. Cl. 179—1 7 Claims

ABSTRACT OF THE DISCLOSURE

An intercommunication system has a relay for selectively connecting an amplifier input alternately to one or the other of two remotely spaced electroacoustical transducers in accordance with a designated direction of communication. An intermediate stage of the amplifier is suppressed for short intervals in response to the energization and deenergization of the relay to provide noiseless switching by suppressing output from the amplifier during the time of operation of the relay contacts. A photoconductor is used to suppress the amplifier, having a control lamp that is energized for a short interval by one or the other of two transistors which are respectively turned on in accordance with whether potential across the winding of the relay is increasing or decreasing respectively. A privacy switch associated with one of the transducers selectively controls the bias on a diode which in turn selectively suppresses the intermediate stage of the amplifier.

BACKGROUND OF THE INVENTION

This invention relates to intercommunication systems, and it more particularly relates to two-way intercommunication system having means for selectively suppressing output of an amplifier.

Two-way intercommunication systems are generally known which have a single amplifier that is common to both directions of communication between remotely spaced bilateral transducers. When a transducer is operating to transmit, it must be connected to the input of the amplifier, and when such transducer is serving as a speaker, it must be connected to the output of the amplifier. Switching of communications to the amplifier is accomplished by a talk-listen switch, the operation of which generally causes a clicking sound in the speakers.

SUMMARY OF THE INVENTION

In the system according to the present invention, the amplifier is selectively suppressed to at times provide privacy control and at times provide noiseless switching.

A relay is used to switch connections of the input to an amplifier to respective transducers, dependent upon the designated desired direction of communication. Potential change across the winding of the relay, both when the relay is energized and when the relay is deenergized, is used to control switches respectively which in turn suppress, or squelch, an intermediate stage of the amplifier, thus providing noiseless switching.

A privacy switch associated with one of the transducers selectively grounds one of the transducer output wires to selectively forward or reverse bias a diode associated with the intermediate stage. This suppresses the intermediate stage when the relay connects the transducer having privacy control actuated to the input of the amplifier.

An object of the present invention is to selectively suppress a stage of an amplifier in an intercommmunication system at time of switching or for privacy control.

Another object of the present invention is to generate a pulse to suppress an amplifier stage in response to a change in energization of the winding of a talk-listen switching relay.

Other objects, purposes and characteristic features of the present invention will be in part obvious from the accompanying drawing, and in part pointed out as the description of the invention progresses.

In describing the invention in detail, reference is made to the accompanying drawing showing one embodiment of an intercom system organized according to the present invention comprising transducers 10 and 11, which may be located at remotely spaced locations, and which are selectively connected by a relay 12, to the input of an amplifier which is common to both directions of communication. The amplifier comprises a first stage differential preamplifier 13, a second stage preamplifier and driver 14 and a power amplifier stage 15.

A talk-listen switch 16 is provided to control the energization of the relay 12. The second stage preamplifier and driver 14 comprises transistors Q1 and Q2, which are normally biased to operate as Class A amplifiers.

A photoconductor and lamp unit 17 is provided for at times squelching the amplifier transistor Q1 for the purpose of providing noiseless switching when contacts of the relay 12 are operated.

A privacy switch 18 and a diode 19 are provided for selectively squelching output of the transistor Q1 when privacy is designated by closure of the switch 18 associated with transducer 10.

Switching transistors Q3 and Q4 are provided for controlling the energization of a lamp 20 in the lamp and photoconductor unit 17. The energization of lamp 20 reduces the resistance of the associated photoconductor 21. Bias for normal operation of transistor Q1 as a Class A amplifier is provided by a circuit extending from (+) through resistor 22, resistor 23 and resistor 24 to ground. The base of transistor Q1 is connected at a point 26 between the resistors 23 and 24 in the circuit just described, this also being the input point for transistor Q1. Output of the first stage preamplifier 13 is applied as an input to the base of transistor Q1 through coupling capacitor 25.

The preamplifier 13 has two input wires 27 and 34 which are selectively connected by the relay 12 to transducer 10 or transducer 11 in accordance with whether or not the relay 12 is energized. With the relay 12 in its deenergized condition, the system is set up for operation with transducer 10 acting as a transmitter and transducer 11 is connected to the output of the power amplifier stage 15. More specifically, input wire 27 extends from amplifier 13 through back contact 28 of relay 12 and wire 29 through a winding 30 of transformer 31 (associated with transducer 10), wire 32, and back contact 33, to input wire 34 of amplifier stage 13. At this time, output of the power amplifier stage 15 is connected to winding 35 of transformer 36 (associated with transducer 11) through back contacts 37 and 38 of relay 12. The diode 19 is reverse biased at this time, assuming privacy switch 18 is open, because of its connection to a point 39 in a circuit connecting the input wires 27 and 34 through resistors 40 and 41. The point 39 is normally more positive than the point 26, and thus the diode 19 is normally reverse biased and has no material effect upon operation of the amplifier. Thus, for the condition of the system as illustrated, the intercommunication system is effective to transmit from transducer 10 and receive in transducer 11.

The intercommunication system may be used, for example, in a school wherein the transducer 11 is at a master station, that may be in the principal's office, and the transducer 10 may be in a classroom. When the system is not in use for transmission from the classroom, a teacher in the classroom may prevent transmission by transducer 10 from reaching transducer 11 by actuation of the privacy switch 18 to its closed position. This grounds the wire 32, and thereby grounds the input wire 34 of the first stage 13 of the amplifier, this ground being applied through back contact 33 of relay 12, and thus being effective only when the relay 12 is in its deenergized position. With the switch 18 closed and with the back contact 33 closed, the diode 19 has its cathode connected through resistor 41 to ground, which makes the cathode of diode 19 less positive than its anode, thus forward biasing the diode 19 and reducing the positive bias at point 26 for the base of transistor Q1 to a point to squelch transistor Q1. It will be readily apparent that this squelch prevents transmission from transducer 10 to transducer 11 only when the relay 12 is in its deenergized position. If the operator at transducer 11 wishes to transmit to station 10, the actuation of the talk-listen switch 16 causes the picking up of relay 12 to connect the transducer 11 to the input of amplifier stage 13, and to connect the transducer 10 to the output of power amplifier stage 15. Even though the privacy switch 18 remains closed under these conditions, the relay 12 is energized, and the connection of the cathode of diode 19 to ground through back contact 33 of relay 12 is open, thus restoring the diode 19 to its normal reverse biased condition and permitting an output of the power amplifier stage 15 to be modulated by voice input to transducer 11.

To obtain best operation of the privacy control circuit, it is preferable that the diode 19 be of germanium, and that it be used to control a silicon transistor Q1.

To provide noiseless switching of the contacts 28, 33, 37 and 38 of relay 12, relay 12 is energized through a resistor 42, and the winding of relay 12 is connected in a differentiating circuit to complementary switching transistors Q3 and Q4. Transistor Q3 is a NPN transistor, and transistor Q4 is a PNP transistor. The emitter of transistor Q3 and the collector of transistor Q4 are connected to ground, which is also connected to one side of the winding of relay 12. The base of transistor Q3 is connected to the other side of the winding of relay 12 through wire 48, capacitor 43 and resistor 44, and the base of transistor Q4 is connected to the left hand side of the winding of relay 12 through wire 48, capacitor 45 and resistor 46. A capacitor 47 is connected across the winding of relay 12.

With the talk-listen switch 16 in its open position, as in the condition illustrated in the drawing, there is no input to transistors Q3 and Q4 on wire 48, and thus there is no output applied by either of these transistors. Therefore, the lamp 20, which is connected to the outputs of both transistors Q3 and Q4, is normally extinguished.

When the manually operable talk-listen switch 16 is closed, capacitor 47 starts to charge through resistor 42, and a potential is built up across the winding of relay 12. The positive going signal on wire 48 at this time turns transistor Q3 on, which in turn energizes lamp 20 and causes photoconductor 21 to squelch transistor Q1 through a capacitor 49. When full power supply potential is reached on wire 48 transistor Q3 becomes turned off, and the lamp 20 is extinguished to terminate the squelch interval applied to the transistor Q1. It has been found that if the time constants of the circuit are adjusted to provide approximately a 50 millisecond squelch interval, the contacts of the relay 12 have time to be operated noiselessly while the amplifier is suppressed.

When the talk-listen switch 16 is open to again change the direction of communication, the decay of flux in the relay 12 generates a negative going pulse which is applied through capacitor 45 and resistor 46 to turn on transistor Q4. When transistor Q4 is turned on, the lamp 20 is illuminated, and a squelch is applied to transistor Q1 for the 50 millisecond interval, thus suppressing the amplifier during the shifting of the contacts of relay 12 from their picked up to their dropped away positions, and providing noiseless switching.

Having thus described one embodiment of an intercommunication system having selected suppression control of its amplifier, it is desired to be understood that this form is selected to facilitate the disclosure of the invention, rather than to limit the number of forms that the invention can assume. While the invention has been described in its preferred embodiment, it is to be understood that the words which have been used are words of description rather than of limitation, and that changes can be made in accordance with the requirements of practice.

What is claimed is:

1. A system for selectively suppressing an amplifier in an intercommunication system wherein an amplifier has its input connected alternately to one or the other of two electroacoustical transducers at spaced locations in accordance with the direction of desired communication and wherein the improvement comprises,
- (a) a relay having a winding and contacts operable for selectively connecting the input of the amplifier to one transducer or the other in accordance with a designated direction of communication,
- (b) manually operable means for selectively energizing the winding of the relay to control the direction of communication between stations, and
- (c) noise suppression means responsive to the energization or the deenergization of the winding for suppressing output of the amplifier for a measured time interval sufficient to cover the time of operation of the relay contacts,
- (d) whereby any noise generated by operation of the relay contacts cannot be transmitted to one of the transducers.

2. The invention according to claim 1 wherein a privacy switch is provided in association with a particular one of the transducers for selectively grounding one of two control wires for the associated transducer, and privacy suppression means is provided for responding to the grounding of said one control wire to suppress output of the amplifier when the relay connects said particular transducer to the input of the amplifier.

3. The invention according to claim 2 wherein the privacy suppression means comprises a solid state switch which permits an output from the amplifier only when the solid state switch is reverse biased, and means is provided for forward biasing the solid state switch by actuation of the privacy switch.

4. The invention according to claim 3 wherein the solid state switch is a germanium diode and the diode is used to control the bias on the base of a silicon transistor stage of the amplifier.

5. The invention according to claim 1 wherein the suppression means comprises,
- (a) lamp and photoconductor means for suppressing the output of the amplifier when the lamp is energized,
- (b) switching means having first and second transistors for energizing the lamp when either the first or the second transistor is turned on, and
- (c) circuit means responsive to the energization and deenergization of the winding of the relay for turning on said first and second transistors respectively for a limited time interval.

6. The invention according to claim 5 wherein means is provided for maintaining each of the switching transistors turned on only for an interval slightly longer than the time required for operation of the contacts of the relay.

7. A system for selectively suppressing an amplifier in an intercommunication system wherein an amplifier has its input connected alternately to one or the other of two transducers at spaced locations in accordance with the direction of desired communication, and wherein the improvement comprises,
- (a) means for selectively connecting the input of the amplifier to one transducer or the other in accordance with the desired direction of communication,
- (b) a privacy switching means associated with one of the transducers for selectively grounding a wire connecting that transducer to the amplifier, and (c) suppression means for selectively suppressing output from the amplifier in accordance with whether or not said wire is grounded when said one transducer is selected for connection to the input of the amplifier, the suppression means comprising, a germanium diode which is selectively forward and reverse biased in accordance with the condition of the privacy switching means, the diode being used to control bias in a stage of the amplifier having a silicon transistor.

References Cited

UNITED STATES PATENTS

| | | |
|---|---|---|
| 1,523,102 | 1/1925 | Betts. |
| 2,802,900 | 8/1957 | Baker. |
| 3,365,546 | 1/1968 | Kemper. |

KATHLEEN H. CLAFFY, Primary Examiner

J. S. BLACK, Assistant Examiner

U.S. Cl. X.R.

325—21, 403